A. J. PAIGE.
PACKING.
APPLICATION FILED NOV. 28, 1913.

1,136,435.

Patented Apr. 20, 1915.

WITNESSES:
Frank A. Fahle
Josephine Gasper

INVENTOR
Arthur J. Paige
BY
Arthur M. Good
ATTORNEY

UNITED STATES PATENT OFFICE.

ARTHUR J. PAIGE, OF INDIANAPOLIS, INDIANA.

PACKING.

1,136,435.   Specification of Letters Patent.   Patented Apr. 20, 1915.

Application filed November 28, 1913.   Serial No. 803,400.

*To all whom it may concern:*

Be it known that I, ARTHUR J. PAIGE, a citizen of the United States, residing at Indianapolis, in the county of Marion and State of Indiana, have invented a new and useful Packing, of which the following is a specification.

The object of my invention is to produce an improved gas tight packing for association with gas ports, the packing having been especially designed for use in an internal combustion engine of peculiar type wherein the work cylinders are provided with laterally projecting ports which coöperate with an annular surface lying in a plane parallel with the axial plane of the work cylinder and at right angles to the axis of relative movement between the work cylinders and the annular surface, but it will be readily understood that the invention is not limited to that particular use.

The accompanying drawings illustrate my invention as embodied in an internal combustion engine of the type already mentioned.

Figure 1:
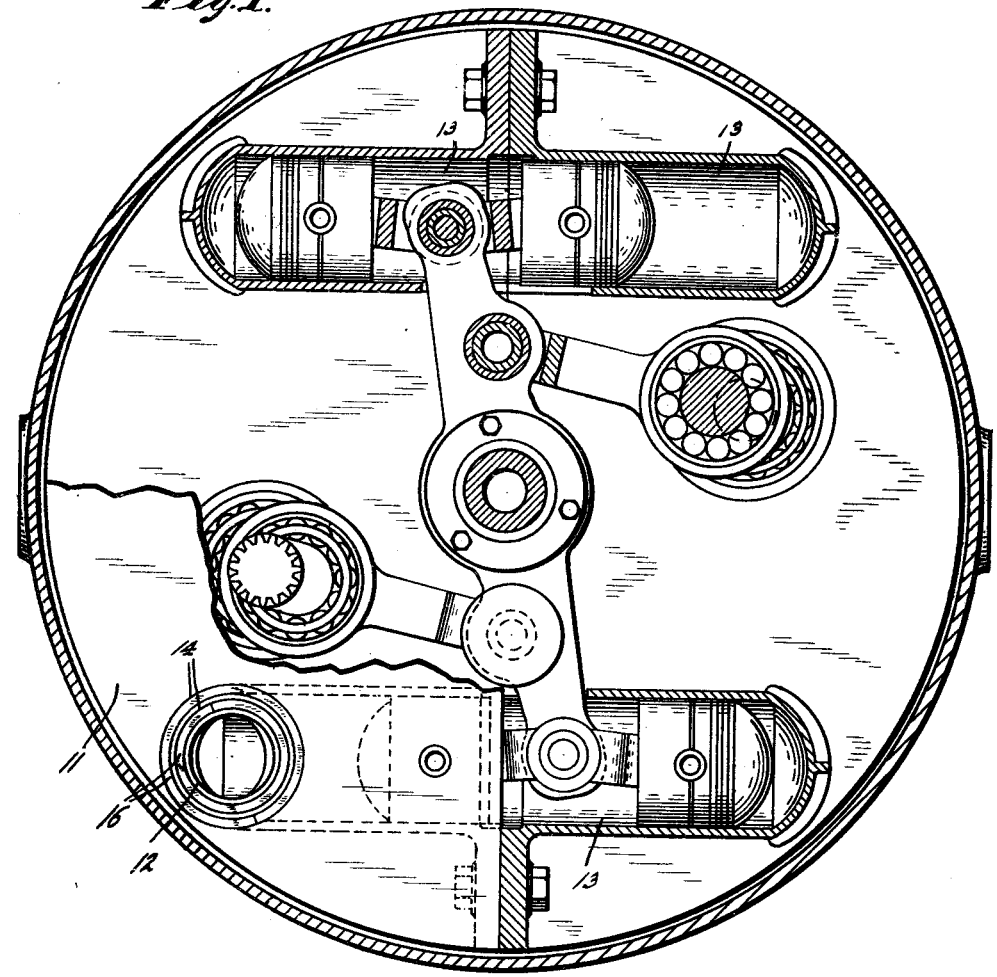
Figure 2:
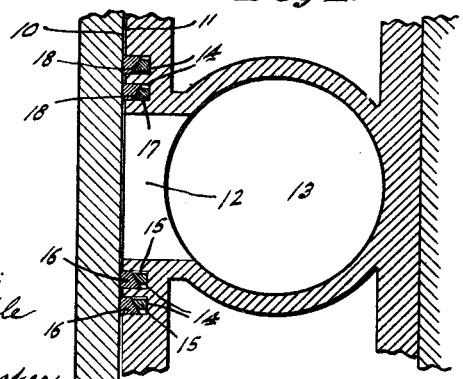

Figure 1 is a section, axially of the work cylinders, of an engine of the type mentioned, a portion, however, being shown in elevation in order to show the relative arrangement of my improved packing; Fig. 2 is a transverse section of a packing and adjacent parts, on a larger scale.

In the drawings, 10 and 11 indicate two adjacent surfaces, the surface 10 being a flat surface upon which the outer member of my improved packing will lie. Formed through the surface 11 is a passageway or port 12 which, in the form shown in the drawings, gives access to and egress from the work cylinder 13. Surrounding the passage 12 and formed in the body of the member carrying the surface 11 is a circular groove 14. Mounted in groove 14 are two mating packing rings 15 and 16. The ring 15 has a radial dimension considerably less than the radial dimension of the groove 14 and has an outer face 17 which is inclined at an acute angle to axial lines on the inner circumference of the ring. The ring 16 has a radial dimension which may be such as to snugly fit the radial dimension of the groove 14 or may be less than that dimension and its inner end is beveled at 18 to complement the surface 17 of ring 15, thus lying at an obtuse angle to axial lines on the inner circumference of ring 16. The angle of inclination of the surfaces 17 and 18 is such that ring 15 may expand beneath ring 16 and thus urge ring 16 against surface 10. Ring 15 is radially split and ring 16 is also preferably radially split and when so split the outer circumference of ring 16 should complement the outer face of groove 14. The parts are so proportioned that ring 15 will be somewhat expanded when lying free within the groove 14 so that when ring 16 is placed in position and urged axially inward the ring 15 will be radially compressed and, if the ring 16 be split, the said ring 16 will be radially expanded so that when the outer face of ring 16 is brought against the surface 10, the adjoining surface of the ring 16 will be yieldingly urged against the surface 10 and, at the same time, the external circumferential surface of the ring 16 will be yieldingly urged against the external circumferential surface of the groove 14 and thus simultaneously provide two packed surfaces lying at an angle to each other and both surrounding the passage 12 which is to be isolated.

I claim as my invention:

1. The combination of a pair of relatively movable members having complementary working faces one relatively movable and one laterally ported and having a circular groove therein surrounding the port, and a pair of packing rings mounted in said groove one upon the other, the outer ring being radially split and having an outer face complementing the adjacent working face of the other member and having an external circumferential face complementing the external circumferential face of the groove, and the inner ring being radially split and having a radial dimension considerably less than the radial dimension of the groove, the two rings having adjacent complementary beveled faces whereby radial variation in the inner ring will vary the axial position and radial dimension of the outer ring.

2. The combination of a pair of relatively movable members having complementary working faces one relatively movable and one laterally ported and having a circular groove therein surrounding the port, and a pair of packing rings mounted in said groove one upon the other, the outer ring having an outer face complementing the adjacent working face of the other member, and the inner ring being radially split and having a radial dimension considerably less than the radial dimension of the groove, the two rings having adjacent complementary beveled faces whereby radial variation in the inner ring will vary the axial position of the outer ring.

In witness whereof, I have hereunto set my hand at Indianapolis, Indiana, this 25th day of November, A. D. one thousand nine hundred and thirteen.

ARTHUR J. PAIGE.

Witnesses:
ARTHUR M. HOOD,
G. B. SCHLEY,